March 13, 1962 A. K. CHITAYET 3,024,699
LIGHT MODULATION SYSTEM
Filed June 15, 1956 3 Sheets-Sheet 1
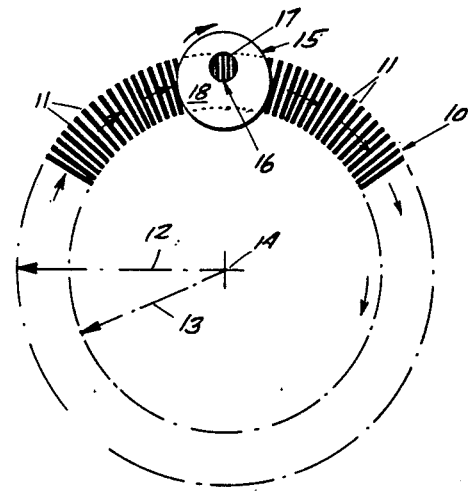
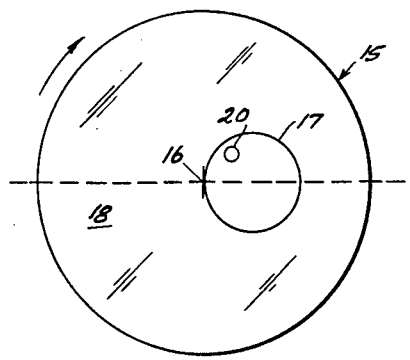
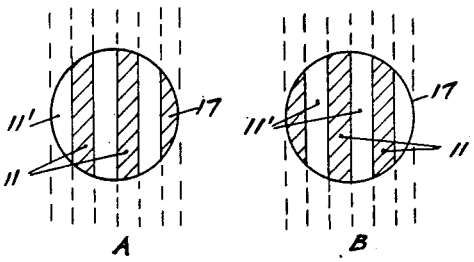
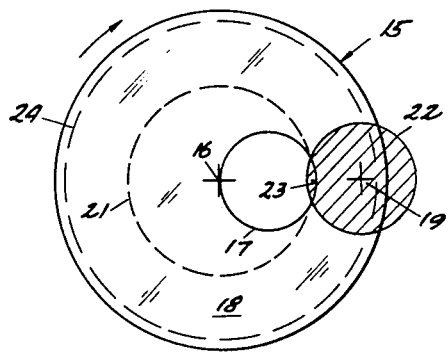
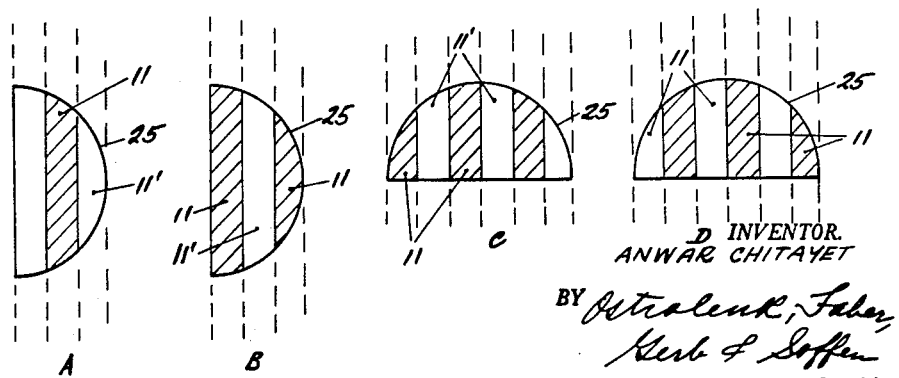
INVENTOR.
ANWAR CHITAYET
ATTORNEYS

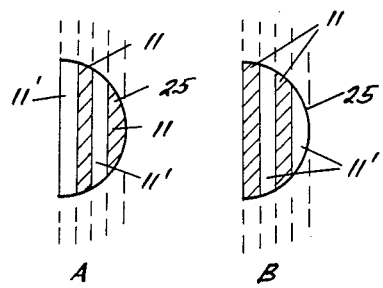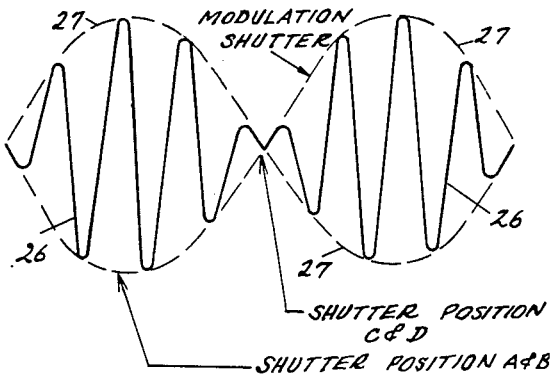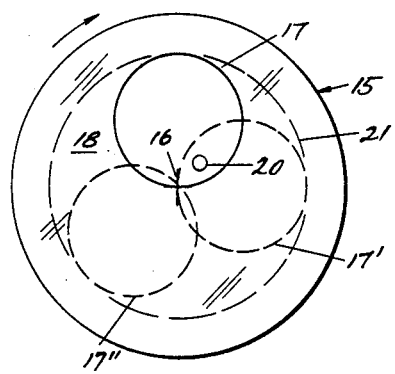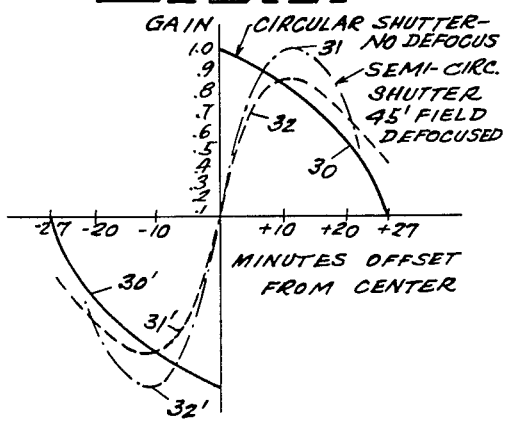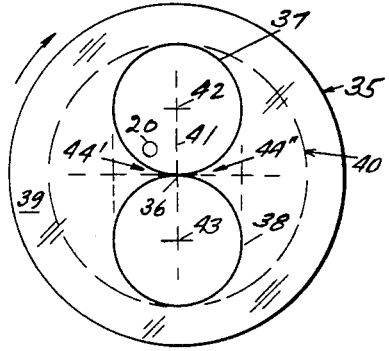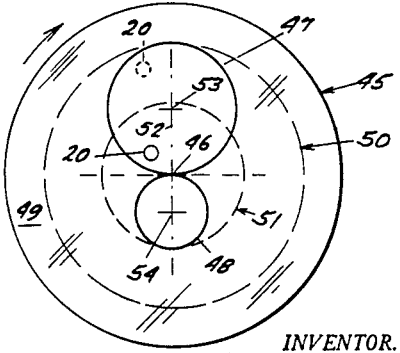
INVENTOR.
ANWAR CHITAYET
ATTORNEYS March 13, 1962  A. K. CHITAYET  3,024,699
LIGHT MODULATION SYSTEM
Filed June 15, 1956  3 Sheets-Sheet 3
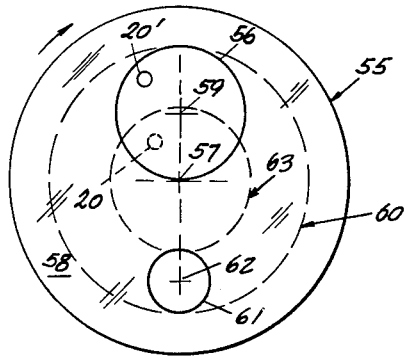
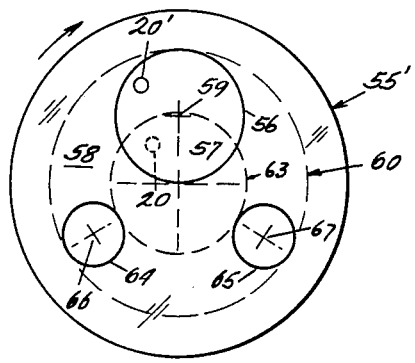
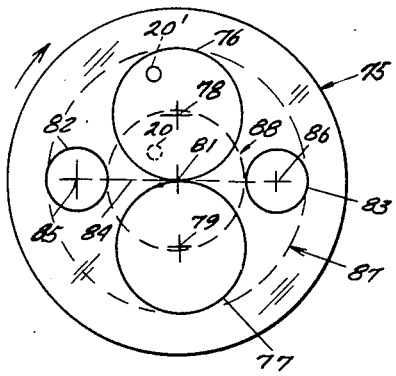
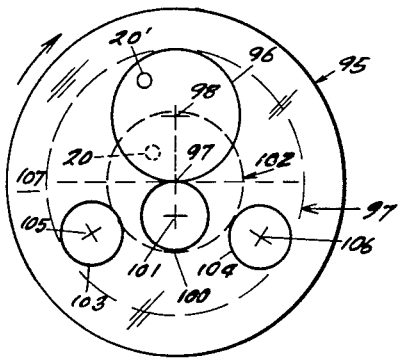
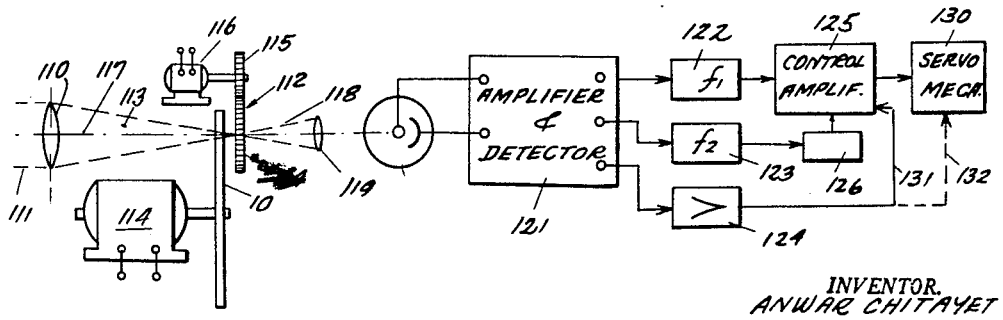
INVENTOR.
ANWAR CHITAYET
BY
ATTORNEYS United States Patent Office 3,024,699
Patented Mar. 13, 1962

3,024,699
LIGHT MODULATION SYSTEM
Anwar K. Chitayet, Bronx, N.Y., assignor to Kollsman Instrument Corporation, Elmhurst, N.Y., a corporation of New York
Filed June 15, 1956, Ser. No. 591,576
15 Claims. (Cl. 88—61)

This invention relates to light modulation systems and more particularly relates to improvements in shutter arrangements for light tracking devices.

The invention system is in the nature of an improvement of the shutter mechanism and light modulation system shown and described in co-pending patent application Serial No. 321,696 filed November 20, 1952, now Patent No. 2,905,828 for Light Tracking Device assigned to the same assignee as the present invention. A light tracking device is essentially utilized for navigational purposes and is provided with an optical system adapted to transmit an image of a celestial object to means which will seek to operate the optical system to maintain the image in the center of the field of view. The movements of the optical system may then be translated into corresponding movements of location indicia or into predetermined movements of operating or adjusting members for craft guidance instruments or devices.

In such light tracking systems the stars, the moon and even the sun are utilized for the navigational sighting. The background of the field of view is frequently illuminated in conjunction with the celestial body to be tracked. The aforesaid patent application discloses a light tracking device having a double modulation system for the light impinging thereon, arranged to minimize errors caused by the backround lighting. The double light modulating mechanism comprises a rotating disc having a raster of alternate opaque and transparent areas interrupting the field of view to the light sensitive medium, such as a photoelectric tube. A semi-circular shutter was used to further interrupt the light beam in the field of view at a lower frequency than that produced by the raster.

Such double modulation of the field of view substantially eliminates errors due to background illumination entering the system in conjunction with light from the celestial body to be tracked. Circuit arrangements and means are provided in the referred to patent application to detect the directional information from the desired celestial body and translating such information as signals which automatically are effective in the light tracking device for predetermined orientations or operation.

In the described prior system, it has been found that the semi-circular shutter used to effect the double light modulation produces a false signal similar to that which a star presence would effect and that such false signal was due to the background illumination in the field of view. The false signal, corresponding to characteristics of a star presence signal, affected accuracy of the light tracking system. It also made the detection of a star from background very difficult when the background illumination, such as from the moon or near-twilight conditions, was present. The frequency characteristic of the error signal was at the frequency of the raster modulation, modulated at the shutter rotational frequency. The herein improved light modulation system overcomes such signal errors.

In accordance with the present invention, low frequency modulation of a raster-modulated light beam is effected by a shutter with an off-center circular opening. The shutter opening of the invention system is such as to present a substantially uniform area in its rotational path to the raster-modulated light beam passing therethrough, as will be more fully described hereinafter. The prior art semi-circular shutter, or shutters of other shapes that presented a non-uniform transversal of the raster modulated field of view, produced the aforesaid signal error in a manner to be fully set forth. The off-center circular opening, or symmetrical low frequency modulation shutter of the present invention, avoids the signal errors due to background illumination and results in a marked increased sensitivity of the light tracking system to track celestial bodies through fields with background illumination.

The invention shutter decreases the background direct current in the light tracking system by a factor of two with the same field. Thus, the dominating shot effect in the associated electronic system is decreased by a factor of 1.41. For a given light tracking system, the use of the present invention allows the tracking and recognition of stars at a much higher background illumination than with previous shutters. Such system may track stars at night under full moon conditions with full accuracy, as well as under light clouds or hazy atmosphere. In fact, the invention permits a light tracking system to accurately track stars into twilight conditions.

Other embodiments of the invention system include a plurality of circular openings arranged in an opaque shutter to enhance the sensitivity of the light tracking device to tracking and/or acquisition. Further, by creating signal frequencies or pulses through the invention shutter action, different in accordance to the position of the star in the field of view, selective operation of the light tracking device is afforded. Each of the circular openings in the novel shutter is either tangent to or off from the center thereof and intercepts the raster lines symmetrically to avoid the signal errors aforesaid.

It is accordingly an object of the present invention to provide a novel light modulation mechanism incorporating a symmetrical intercepting shutter arrangement.

A further object of the present invention is to provide a novel light tracking mechanism incorporating a shutter having an off-center circular opening that produces signals with no raster signal error due to background field illumination.

Another object of the present invention is to provide a novel double light modulation mechanism that eliminates the generation of false signals due to background lighting in the field of view.

Still another object of the present invention is to provide a novel light modulation system for a light tracking device that extends a sensitivity of star tracking and recognition to a much higher figure of background illumination as compared to prior systems.

Still a further object of the present invention is to provide a novel light beam shutter arranged with a plurality of openings that enhance the sensitivity of the system for star tracking and/or acquisition.

These and further objects of the present invention will become more apparent in the following description of a preferred embodiment thereof, taken in conjunction with the drawings in which:

FIGURE 1 is a face view of the invention double light modulation system.

FIGURE 2 is an enlarged face view of the shutter of the invention system.

FIGURE 3 is a diagrammatic representation of the action of the invention shutter opening.

FIGURE 4 is a diagrammatic representation of a tracking operation of the shutter.

FIGURES 5 and 6 are diagrammatic representations of the action of a semi-circular shutter.

FIGURE 7 is a curve of the electrical error signal produced by the semi-circular shutter of FIGURES 5 and 6.

FIGURE 8 is another diagrammatic representation of the action of the invention shutter.

FIGURE 9 is a set of gain curves of a light tracking system incorporating the invention device.

FIGURE 10 is a modified shutter arrangement, in accordance with the invention, which increases the signal sensitivity of tracking.

FIGURE 11 is a further modification of the invention shutter with selective sensitivity increase of star tracking at the central portion of the field of view.

FIGURES 12, 13, 14 and 15 are further embodiments of the invention shutter for selective sensitivity increase of signals for star tracking and/or acquisition.

FIGURE 16 is a schematic diagram of a system incorporating the invention light modulation arrangement, including an electronic amplifier and control system that is selectively operated in accordance with the modulated signals.

Referring to FIGURE 1, a raster disc 10 is arranged between a telescope and a photoelectric pick-up (not shown) to intercept the collimated light beam in the manner shown and described in connection with FIGURE 1 of the aforesaid patent application and illustrated in FIGURE 16 hereof. A series of opaque raster lines 11, 11 is arranged about the periphery of the raster disc 10 between the two radial positions 12, 13 thereof. The raster lines 11, 11 alternate with the transparent raster areas 11', 11' of width or thickness equal to lines 11, 11. The raster lines 11, 11' are not less in width than the diameter of the image of the stars to be tracked in the field of view. The raster lines 11, 11' extend completely about the annular area of raster disc 10 subtended by the circles of radii 12 and 13.

At the sector of raster disc 10 through which the collimated light beam from the celestial area to be tracked is passed shutter disc 15 is arranged. The center of shutter disc 15 is arranged centrally of the field of view, and the shutter 15 is rotated about an axis through its center 16. In FIGURE 1 raster disc 10 is rotated clockwise at a predetermined rate about its axis 14. Shutter 15 is also rotated about its axis 16 in the clockwise direction. The light beam is accordingly intercepted by the high frequency raster 11, 11' to produce a basic high frequency carrier signal in the light tracking system as set forth in the aforesaid co-pending application. The slower rotating shutter disc 15 effects modulation of the higher frequency raster-created carrier signal. In other words, rotation of the shutter 15 results in a low frequency signal modulation of the high frequency raster-produced carrier signal.

As will be further detailed hereinafter, rotation of the invention shutter 15 with respect to the rotating raster 11, 11' does not produce a modulation of the raster signal carrier unless there is a celestial body such as a star within the field of view. The star light is modulated by the shutter 15. Towards this end, shutter 15 has an eccentrically located opening 17 tangent to the central axis 16 of shutter 15. The shutter body 18 is opaque in order that the light beam passing through the field of view of the system is prevented from passing the shutter 15 except through its circular aperture 17. Rotation of shutter 15 about axis 16 causes aperture 17 to execute a circular pattern with respect to the moving raster lines 11, 11'.

In view of the symmetrical intercepting nature of aperture 17 due to its particular pattern of exposure across raster lines 11, 11', no modulation of the raster signal is effected thereby due to aperture 17 motivation, merely due to background light. Positional modulation of the raster signal is effected by star presence in the same manner as by the semi-circular shutter in the aforesaid application. However, the disadvantage of a semi-circular shutter where spurious or erroneous signals are created as a modulation of the raster frequency due to background field is avoided by the shutter 15, as will be explained hereinafter in connection with FIGURES 5 to 7. The center 16 of shutter 15 is aligned along the optical axis of the light tracking device.

The shutter 15 has its circular aperture 17 tangent to its center 16. Thus, if a star is centered at the optical axis or center 16, it will project light through aperture 17 at all times since the star center coincides with the rotating center 16, exposing part of the tangent shutter aperture 17. Movement of the star body to off-center from the optical axis, or center 16 of shutter 15, causes a non-uniform display of the starlight through aperture 17 and effects a corresponding positional low frequency modulation on the raster carrier signal in a manner similar to the light tracking device described in the co-pending application referred to above.

FIGURE 2 is an enlarged face view of shutter 15 of the present invention containing its aperture 17 in the opaque face plate or shutter disc 18. It is noted that the diameter of aperture 17 is equal to a major part of the radius of shutter 15. However, the diameter of aperture 17 is such as to substantially subtend half the effective length of raster lines 11, 11' in its pattern of circular rotation, as indicated in FIGURE 1. The remaining segment of shutter 15 which is not intercepted by the aperture 17 serves no direct part in the star beam modulation action on the raster carrier. Its utilization with respect to sun image tracking is described in connection with FIGURE 4 hereinafter.

A star image 20 is shown within aperture 17 in FIGURE 2 as off-center from the optical or center axis 16. Rotation of shutter 15 causes aperture 17 to intercept star image 20, except when it appears through the aperture 17 opening. Such obscuration of star 20 periodically due to the rotation of shutter 15 causes the aforesaid positional modulation at the shutter rotational frequency of the raster carrier signal. The amplitude of the modulation by the star 20 image is proportional to the magnitude or brightness of the star. The phase of the modulation on the carrier is dependent upon the relative angular or vector position of the star with respect to the optical axis 16, also as described in the aforesaid patent application. The significant advantageous feature of the invention shutter 15 for the double light modulation of a star beam or other celestial body is the fact that no false modulation of the carrier signal is effected by the shutter action per se due to background light.

Reference is made to FIGURE 3 with respect to such advantageous action of the eccentrically located circular apertured shutter 15 of the invention. In FIGURES 3A and 3B, the circular aperture 17 subtends the same number of transparent and opaque raster lines 11, 11'. For diagrammatic clarification, the raster lines 11, 11' are shown parallel, whereas in the actual raster disc (FIGURE 1), they are radial for practical reasons. In FIGURES 3A and 3B, the number of opaque raster lines 11, 11 subtended by aperture 17 equals the number of transparent areas 11', 11'. The raster construction is with opaque and transparent areas 11, 11' of equal width.

It is to be noted that the amount of light passing through aperture 17 is independent of the position of aperture 17 with respect to the raster lines 11, 11'. In other words, rotation of the raster disc 10 producing relative movement of raster lines 11, 11' across aperture 17, as well as simultaneous rotation of aperture 17 with respect to the raster lines 11, 11', results in no error modulation signal of the raster carrier signal due to background lighting. An important factor herein is that the number of opaque raster lines 11, 11 subtended by the diameter of aperture 17 is equal to the number of transparent raster lines 11', 11'. Were this not the case, the relative movement of the raster areas 11, 11' and opening 17 would cause uneven lighting merely due to the presence of the aperture with respect to the rasters and produce the aforesaid modulation signal error due to background lighting.

Where the diameter of the shutter aperture 17 encloses three opaque and three transparent lines 11, 11', in the preferred embodiment such is equivalent to approximately 27 minutes, and the total field of tracking is approximately 54 minutes. It is to be noted, however, that such 54 minute field is true only for a star. Tracking of the sun produces a larger effective field. Thus, if the sun image center 19 is 15 minutes away from the outside edge of the referred to field, then a part of the sun's light still gets through aperture 17, and the sun may be recognized and tracked. FIGURE 4 illustrates this condition. The aperture 17 of shutter 15 has a diameter equivalent to that shown in FIGURES 3A and 3B, corresponding namely to 27 minutes, with a total field of approximately 54 minutes, represented by the dotted circle 21. The sun image 22 has a diameter of 33 minutes, shown centered at 19, 15 minutes away from the outside edge of the star field 21. The sector 23 of the sun's light gets through aperture 17, and corresponding positional modulation signals are produced by the shutter system hereof.

The sun thus is recognized, and tracked by the light tracking device utilizing the invention modulator. The dotted circle 24 indicates the field for aquisition of the sun 22 and is 54+30=84 minutes in diameter. The shutter plate 18 is otherwise opaque and is made to subtend a diameter somewhat larger than the 84 minutes hereof. In the example cited herein, it is important to note that an even number of lines is used, namely the same number of opaque raster lines 11 and transparent raster lines 11', giving a total of an even number of raster areas 11, 11' for circle 17. Using the aforesaid three opaque and three transparent rasters 11, 11' produces a 54 minute star field. A smaller, namely a 45 minute field, would enclose an uneven number of the particular raster lines 11, 11', resulting in poor performance under intense background lighting.

A further choice which may be considered is a field which contains two opaque rasters 11 and two transparent rasters 11'. The latter field is 35 minutes and is generally smaller than a practical light modulation device for light trackers. However, it has the advantage of better and easier sun tracking due to the elimination of the modulated carrier error signal produced by semicircular shutters when the sun is in the field. Utilization of the invention light modulation device eliminates the need for a low frequency amplifier for sun tracking.

FIGURE 5 diagrammatically illustrates the way in which a semi-circular shutter 25, rotating across a raster of alternate opaque lines 11 and transparent lines 11' (of equal width), causes the aforesaid error modulation in the raster carrier signal. FIGURES 5A and 5B show semi-circular opening 25 arranged vertically with three rasters 11, 11' passing therethrough. In FIGURE 5A, it is noted that one opaque raster line and two transparent lines 11' pass much more light through shutter 25 than that of FIGURE 5B. In the shutter 25 position shown in FIGURE 5B, two opaque lines 11 and one transparent line 11' produce far less passage of light than the position of FIGURE 5A.

In FIGURES 5C and 5D, semi-circular shutter 25 is in the horizontal position and subtends six raster lines alternating with three opaque lines 11 and three transparent lines 11'. These horizontal positions of shutter 25 cause substantially the same amount of light to pass where an even number of raster lines 11, 11' are subtended. Thus, the movement of rasters 11, 11' with respect to semi-circular shutter 25 produces raster carrier frequency modulation even when just background light is present. Such modulation error signal reaches its maximum amplitude when shutter 25 is in the vertical positions corresponding to FIGURES 5A and 5B and its zero or minimum position when shutter 25 is at the horizontal positions corresponding to FIGURES 5C and 5D.

FIGURE 7 illustrates the signal curve resultant as the error modulated carrier signal. The high frequency signal portion 26 results from the movement of raster lines 11, 11' with respect to the field of view and the passage thereof through the rotating semi-circular shutter area 25. The low frequency modulation amplitude 27 of the higher frequency signal, as shown by the dotted envelope 27, 27, is due to the rotation of the semi-circular shutter 25, as described in connection with FIGURE 5 and is at the (lower) frequency of rotation of shutter 25.

The same effect as described in connection with FIGURES 5 and 7 results even when the diameter of semi-circular shutter 25 subtends an even number of raster lines 11, 11'. FIGURE 6A shows shutter 25 subtending two opaque raster lines 11 and two transparent raster lines 11'. However, in FIGURE 6B, with the alternate arrangement of the raster lines 11, 11' as compared to FIGURE 6A, a significantly less amount of light is passed through as compared to the passage through the arrangement of FIGURE 6A. Thus, the prior art semi-circular shutter 25 causes an error modulation despite the number of raster lines 11, 11' it subtends. Similar error signals were produced by other shapes of shutters which the symmetrical uniformly intercepting shutter of the invention overcomes.

FIGURE 8 illustrates the invention shutter 15 with the circular aperture 17 tangent to axis 16. The star field of view of shutter 15 with the aperture 17 is indicated by dotted circle 21. The shutter body 18 is made opaque and of larger diameter than field circle 21 to effect acquisition and tracking of the moon and the sun as described in connection with FIGURE 4. The rotation of shutter 15 carries circular aperture 17 in the clockwise direction, to alternately expose and obliterate the passage of the star 20 image. The dotted position 17' of the circular aperture is 90° from the initial vertical position 17.

There is a symmetry of aperture action in its positions 17 and 17' as they subtend identical raster configurations, namely, an even number of raster lines 11, 11' shown in FIGURE 3. It is to be noted that the diameter of aperture 17 is designed to subtend the same number of opaque and transparent raster lines 11, 11' as aforesaid. The position of the aperture at 17" shown at a 45° angle to the vertical is illustrated to indicate its equivalent configuration and raster interception action with respect to the raster lines (not shown); that is, irrespective of the angle, the raster interception is the same. Following through the rotation of aperture 17 across the raster lines, as in FIGURES 1 and 3, results in no modulation of the raster due merely to background field illumination because of the symmetrical extension of the circles 17, 17', 17", etc. with respect to the center of rotation 16.

An identical number of raster lines is transversed by the aperture 17 in any of its angular positions in the rotational pattern about axis 16. Also, its light transmission action across the raster path is of uniform interception. The deficiency of semi-circular apertures described in connection with FIGURES 5, 6 and 7 is thus substantially overcome, and no error signal occurs due to the rotation of the aperture 17 with respect to the raster lines 11, 11'. However, the presence of a celestial body, such as a star 20, scanned by the circular aperture 17 (see FIGURES 2 and 8) or of the sun 22 (see FIGURE 4) or of the moon results in double modulation of their light image within the field of view and a celestial body position signal modulated carrier as will now be understood by those skilled in the art.

An important factor of the invention shutter is that the configuration of its eccentrically positioned aperture 17 is such as to subtend equally the raster pattern in all its angular positions of rotation in a manner to avoid modulation of the raster merely due to background illumination. The circular configuration for aperture 17 has been found most satisfactory for this purpose. Also, as noted above, it is important that the number of opaque raster lines and the number of transparent raster lines that are subtended by a diameter of the circular aperture 17 be the same to ensure this advantageous result.

FIGURE 9 is a graph showing gain vs. minutes off-center of a system using shutter 15, provided that the star were a point, and also with an intentional defocusing of 10 minutes star radius. By the expression "circular shutter" we refer to the invention shutter with a circular aperture 17 eccentrically related and tangent to the axis 16 of the shutter 15. With no defocus of the star, it is noted that a gain of 1.0 occurs at the center of the field, with a decreasing of signal along curve 30 until zero gain or zero signal is realized at the field plus 27 minutes off center. The converse condition occurs in the opposite sector at curve 30. With the prior art semi-circular shutter, in a 45 minute field, with a defocused star image, the sinusoidal gain curve 31, 31' is effective, falling sharply off at 22.5 minutes offset from center. With the invention "circular shutter," and a 54 minute field with defocused star image, the effective curve 32, 32' is realized with an effective signal still at 27 minutes offset from center.

It has been found that with the eccentric circular aperture shutter 15 the background direct current of a light tracking device utilizing such system is decreased to one-half while maintaining the same field. Thus, the dominating shot effect in the amplifier system of the photoelectric device is reduced by a factor of $\sqrt{2}$ namely by 1.414. The invention system permits tracking and recognition of stars at a much higher background illumination. With prior systems, recognition of a star has been found difficult even at 0.2 microampere of sky current in a system. With the present invention it is possible to convert the same system to recognize a star at even higher than 20 microamperes of sky current.

Such noise reduction is of substantial import in practical operation of a sensitive light tracking device. It allows tracking of stars at night under full moon conditions and under light clouds or hazy atmosphere. Also, it extends the time of day that a light tracking device utilizing the invention modulating system can track stars into twilight. A light tracking device incorporating the invention shutter arrangement is feasible to track the stars at better than magnitude 1.0 at twilight, and until the sun is at −2 degrees. This enables the light tracking system to track at all times, switching from the tracking of stars to the sun, after −2 degrees of twilight occurs.

FIGURE 10 is a face view of shutter 35 which is a modified version of the heretofore described signal aperture shutter 15. Shutter 35 is utilized in the same manner as the aforesaid shutter 15 for modulating a raster-interrupted light beam. The center of shutter 35 is at 36, and the rotation axis of shutter 35 is about center 36. Shutter 35 has two circular apertures 37 and 38. Each of the circular apertures 37, 38 is tangent to the center 36 of shutter 35. Also, the respective centers 42 and 43 of the apertures 37, 38 are arranged on a diameter 41 of the shutter 35 passing through the centers 36, 42 and 43.

The apertures 37, 38 are arranged 180° apart and are on the same diameter. Essentially the shutter 35 is the same as shutter 15, with the exception of an additional circular aperture 180° away from the single aperture of the above described shutter 15. The double apertured shutter 35 produces a signal frequency twice that of the single aperture shutter 15. This is clear since for each revolution of shutter 35 the star or other body is exposed by apertures 36, 38 twice rather than once for shutter 15 (at the same rate of rotation). Should a predetermined modulation frequency be desired, the double aperture shutter 35 is driven at half the speed as that of single aperture shutter 15, as will be understood by those skilled in the art.

The effective field of view for star acquisition and tracking is indicated by the dotted circle 40 subtending apertures 37, 38. Shutter 35 is made of an opaque material disc 39 into which the apertures 37, 38 are formed.

The apertures 37 and 38 are made of a diameter to subtend an even number of raster lines corresponding to 11, 11' (FIGURE 3). In this manner the exposure of apertures 37, 38 to a background field of illumination will not produce the error signals referred to above.

Subtended between the apertures 37, 38 are two triangular or wedge areas 44' and 44" that are opaque. Interception of a star image 20 by opaque areas 44', 44" is for varying durations of time proportional to the radial or vector distance of the star 20 image from the axis 36 of shutter 35. Suitable pulse detection circuitry may be employed in the modulation of the raster beam signal produced by the wedges 44', 44" to serve as a detector of the vector relationship of the star 20, as described in more detail hereinafter in connection with FIGURE 16.

The modified shutter 45 illustrated in FIGURE 11 has a single large aperture 47 tangent to the axis 46 of shutter 45, in the manner of single aperture 17 of shutter 15, and establishes a basic star acquisition field indicated by the dotted circle 50. A further aperture 48 is arranged tangent to the larger aperture 47. The diameters of both the smaller aperture 48 and larger aperture 47 are equal to an even number of raster lines 11, 11' in order to eliminate background illumination error signal. The apertures 47, 48 are formed in the opaque disc 49 constituting shutter 45.

The diameter or extent of small aperture 48 executes a circular area indicated by the dotted circle 51, wherein increased sensitivity or magnitude of the tracking signal occurs. The coaction of apertures 47 and 48 on a star within the tracking area 51 produces such result. The centers 53 and 54, respectively, of apertures 47, 48 lie on common diameter 52 through the axis 46 of shutter 45. It is to be noted that a star image 20 located within the tracking field 51 is exposed twice by apertures 47 and 48, respectively, for each revolution of shutter 45. Accordingly, the tracking information of the star 20 by shutter 45 is at twice the frequency of the fundamental frequency executed by the main aperture 47 alone.

When located in the "acquisition" or recognition field between circles 50 and 51, star image 20' shown in dotted lines is modulated by only the fundamental frequency as its image is exposed only once per revolution of shutter 45. It is accordingly noted that the shutter 45 provides a single basic acquisition modulation frequency of the raster-modulating light beam for a star image or celestial body in the field of view between circles 50 and 51. As the light tracking device acquires the star image to within tracking circle 51, a greater exposure of the star 20 signal occurs. The double exposure per revolution of apertures 47 and 48 results in a modulation of the raster signal at twice the fundamental frequency. Application of the selective frequencies of such light tracking system is illustrated in FIGURE 16 and described hereinafter.

FIGURES 12 and 13 illustrate in face view still further modified shutters in accordance with the invention. The shutters 55, 55' have a single basic aperture 56 tangent to the center 57 of opaque disc 58. The field of acquisition of tracking by shutters 55, 55' is defined by the dotted circle 60 executed by the rotating pattern of aperture 56, in the manner of shutter 15 hereinabove described. Shutter 55 has an additional smaller aperture 61, the center 62 of which is aligned along a diameter including center 59 of aperture 56. Aperture 61 is located substantially off-center of disc 55. Aperture 61 is tangent to the dotted circle 63. Aperture 61 is also tangent to effective field circle 60. The diameters of apertures 56 and 61 are each equal to an even number of raster lines 11, 11' to avoid modulation errors of the raster signal.

Rotation of shutter 55 creates a double exposure of the sar image 20' located in the acquisition field located between the circles 60 and 63. In other words, both apertures 56 and 61 successively expose the image of a star at position 20' for each rotation of shutter 55, creating a modulation signal of twice the frequency of the shutter rotation. It is to be noted that the effective light signals from the acquisition area of star 20' is accompanied by more impingement upon the light tracking photoelectric system and creates a selective frequency of acquisition as well as a greater sensitivity of signals induced to the tracking mechanism.

More than one acquisition intensifying aperture 61 may be employed. The shutter 55' of FIGURE 13 has two such acquisition intensifying apertures 64, 65. The diameter and radial location of apertures 64 and 65 are the same as that of aperture 61 of FIGURE 12. However, the respective centers 66, 67 of apertures 64, 65 lie on radii that are 120° apart from the radius executed by the center 59 of aperture 56 with axis 57. A star image 20' in the acquisition field between circles 60, 63 is accordingly exposed three separate times by the successive passage of apertures 56, 64, 65 during each rotation of the shutter 55'. Thus, a greater star signal impact of modulation of the raster signal occurs in the acquisition field and at three times the fundamental frequency of rotation of the shutter 55'.

Selective reception of such acquisition signal at three times the fundamental frequency is utilized for improving the acquisition sensitivity of the light tracking system in a manner described in connection with FIGURE 16 hereinafter. It is to be noted that in the shutters 55 or 55' the location of star image 20 within the tracking field 63 results in a single exposure of the image 20 light for each rotation of the shutter and at the fundamental frequency of rotation of the shutter. The operation of shutters 55, 55' on a star image 20 within tracking area 63 is identical to that described in connection with the single aperture shutter 15 hereinabove. The tracking and acquisition star signals are thus at different frequencies.

FIGURE 14 illustrates a shutter 75 of the basic type shown in FIGURE 10 (35) but having two equal and tangent 180° disposed apertures 76, 77. The centers 78, 79 of the respective apertures 76, 77 are on a diameter 80 passing through the center 81 of shutter 75. In addition, there are two 180° opposed acquisition apertures 82, 83 arranged along a diameter 84 perpendicular to diameter 80. The centers 85, 86 of the respective acquisition openings 82, 83 lie on the diameter 84 through axis 81. The diameters of the openings 82, 83 are designed the same as the acquisition openings 61, 64, 65 in FIGURES 12 and 13 and lie between the overall field of view circle 87 and the tracking field of view circle 88. The diameters of the apertures 76, 77 and 82, 83 are equal to an even number of raster lines 11, 11' for the reasons previously stated.

The shutter 75 has a selective and extra sensitive action to a star image such as 20' located in the acquisition field of view of the shutter, namely, between field circles 87 and 88. Fundamentally, the star image 20' in the acquisition area is exposed four times for each rotation of shutter 75, successively through the apertures 76, 82, 77, 83 in clockwise rotation. Thus, a greater utilization of the star image light is effected in the light tracking system due to such four exposures. The resultant frequency is four times the fundamental rotation frequency of shutter 75. When the star image 20 is within the tracking area 88, the acquisition apertures 82, 83 do not expose its image. However, the two apertures 76, 77 duly successively expose the star 20 in its tracking position at a frequency twice the fundamental rotational frequency of the shutter 75. Selective utilization of the frequencies of modulation due to the apertures of shutter 75 is made in the generalized system described hereinafter in connection with FIGURE 16.

Shutter 95 of FIGURE 15 is still a further modification, embodying the features of shutter 55' of FIGURE 13 with that of shutter 45 of FIGURE 11. The basic aperture 96 of shutter 95 is tangent to center 97 thereof and subtends the field of view of star tracking as indicated by circle 97. The center 98 of aperture 96 lies along diameter 99 passing through shutter center 97 and center 101 of secondary aperture 100. Aperture 100 defines the tracking circular field 102. The acquisition or recognition field of shutter 95 lies between circles 97 and 102. Two acquisition-intensifying apertures 103 and 104 are in this acquisition field 97–102. The centers 105 and 106, respectively, of apertures 103 and 104 lie on 120° radii with respect to the radius 99 between axis 97 and center 98 of aperture 96. Aperture 100 is tangent to and 180° apart with respect to main aperture 96.

The composite action of apertures 96, 100, 103, 104 is similar to that performed simultaneously by discs 45 and 55'. Star image 20' in the acquisition field 97—102 is exposed three separate times successively in the clockwise rotation of shutter 95 by apertures 96, 103 and 104. A marked increased signal sensitively of acquisition is created in the signal modulation of the raster carrier and at three times the fundamental frequency of rotation of shutter 95 in the manner heretofore described in connection with shutter 55'. When the light tracking system responds and brings the star image 20 within tracking field 102, acquisition apertures 103, 104 are no longer effective on the star image 20.

Thereupon main aperture 96 and secondary aperture 100 successively scan and expose image 20 with respect to the opaque disc 107 of shutter 95. The enhanced tracking information over that of fundamental aperture 96 alone results in a better tracking sensitivity as described in connection with shutter 45 of FIGURE 11 and is at twice the fundamental frequency. Selective utilization of these signal frequencies results in a significantly improved light tracking device as will now be understood by those skilled in the art. FIGURE 16 is a schematic representation of a system with selective utilization of the signals, such as derived by use of shutter 95 in connection with a raster modulator of a star light beam. The four apertures 96, 100, 103, 104 of shutter 95 are designed with diameters substending an even number of raster lines 11, 11' for the reasons aforesaid.

FIGURE 16 is a diagrammatic representation of the light tracking system utilizing the shutter arrangements of the present invention. The diagrammatic representation of the star tracking system of FIGURE 16 is understood to apply to an automatically tracking telescope, sextant, or the like, as per the aforesaid patent application. It is to be understood that the objective lens 110 receives the collimated background and star light 111 and forms an image of the star and its associated field at or adjacent to the surface of light chopping raster disc 10 (see FIGURE 1). The raster lines of disc 10 are not seen in FIGURE 16 but correspond to those shown in FIGURE 1 at 11, 11'. The shutter is indicated at 112, in the focal plane of the objective lens 110, interrupting focused light beam 113 that passes through the raster disc 10. Raster disc 10 is rotated by motor 114 at a predetermined speed to produce a predetermined raster carrier frequency. The shutter 112 is rotated by an annular gear 114 driven by meshing gear 115 operated by motor 116 at a predetermined rate. The axis of shutter 112 coincides with the optical axis 117 of the telescope optical system.

The shutter 112 may taken the form of any of the shutters of the present invention above described. The raster modulated light beam carrier, passing through raster disc 10, is further signal modulated by shutter 112 as modulated beam 118. Beam 118 passes through condenser lens 119 to photoelectric tube 120. In a preferred embodiment, photoelectric tube 120 is a photo-multiplier tube to create high sensitivity in the light tracking system. The output of photoelectric tube 120 is impressed upon amplifier-detector unit 121 which produces signals of substantial magnitude for further utilization in the system. The output of amplifier-detector unit 121 is impressed upon the selective networks 122, 123 and 124.

Amplifier-detector unit 121 demodulates the carrier-modulated signals impressed upon it by phototube 120 and recreates the respective frequency modulating signals described in connection with the aforesaid invention shutter. If single frequency shutter 15 is used, then units 123 and 124 of the system of FIGURE 16 are not utilized. However, where the shutters have dual frequencies and/or pulse shaping features as do the other described shutters, such composite aspects are utilized.

The fundamental signal frequency $f_1$ is selected by filter unit 122 and imposed upon control amplifier 125. Where a higher frequency is also created, corresponding to $f_2$, it is selected by filter unit 123 and impressed upon conversion unit 126 which in turn is connected to control amplifier 125 to effect a desired result. For example, in shutter 45, the twice frequency tracking signal created by secondary aperture 48 is selected and passed to $f_2$ filter 123 to activate the circuit 126 for enhancing the sensitivity of control amplifier 125 during the tracking position of star 20 within field 51.

Conversely, where the higher frequency $f_2$ is due to the acquisition position of a star image 20', as for shutter 55, 55', the enhanced acquisition feature of the system results in the selection of the twice or thrice frequency $f_2$ of shutter 55, 55' during the acquisition phase of star image 20', to $f_2$ filter unit 123. In such case, the circuit unit 126 is connected suitably to the control amplifier 125 in a manner to enhance the sensitivity and operation of the light tracking system during its star acquisition phase, as will now be understood by those skilled in the art. Where the star image 20 is within the tracking field 63 of shutters 55, 55', the fundamental frequency of signal modulation occurs. This is selected by filter $f_1$ unit 122 and impressed directly upon control amplifier 125 for further suitable utilization. The output of control amplifier 125 is impressed upon the servo-mechanism 130 of the light tracking device, which in turn activates the position of the telescope and associated raster-shutter-photoelectric tube counterparts, in a manner detailed in the aforesaid patent application.

The shutter 75 of FIGURE 14, as described above, generates a quadruple frequency signal modulation during the acquisition positions of the star image 20' and a double frequency signal for tracking position 20 of the star. For a shutter such as 75, the $f_1$ unit 122 is tuned to the double frequency and $f_2$ unit 123 to the quadruple frequency for extra-sensitive acquisition operation of the system on image 20'. Thus, both enhanced tracking and superenhanced acquisition of the light tracking system is afforded, as compared to prior systems. Similarly, for the shutter 95 of FIGURE 15, the star 20 tracking frequency for $f_1$ unit 122 would be double that of shutter rotation; and $f_2$ unit 123 would be at the triple frequency.

Further included in the schematically arranged light tracking system of FIGURE 16 is pulse shape sensory unit 124. Utilization of unit 124 is in conjunction with the type of modulation afforded by wedged pulse shaping areas 44', 44" of shutter 35. The use of unit 124 sensitive to the relative wave shapes produced by areas 44', 44" varying proportional to the vector position of the star image 20 with respect to axis 36 is created by circuitry known to those skilled in the art. The output of pulse sensory unit 124 is connected suitably either to the control amplifier by lead 131 or to servo-mechanism unit 130 by the lead indicated at 132. A signal proportional to the radius at the star image 20 position from axis 36 accordingly activates the control amplifier 125 and/or the servo-mechanism 130 to create a smooth effective sensitive action in the resultant light tracking operation of the system and can be used to minimize hunting and stabilizing the system.

While the present invention has been described in connection with exemplary embodiments thereof, it is to be understood that modifications may be made which fall within the broader spirit and scope of the invention, and it is not intended to be limited except as set forth in the following claims.

I claim:

1. In a light tracking device having a star light beam modulating system and a means for receiving the image of a star in a field of view and focusing the same on the star light beam modulating system; the improvement in the star light beam modulating system which comprises a raster unit rotatable in a plane perpendicular to the path of the beam of light from the star and on a center which brings the periphery thereof into the field of view, said raster having alternate peripheral opaque and transparent areas of light transmission each of width at least that of star images in the field of view and arranged to intercept the light beam to create a raster modulated light beam, and a shutter disc rotatable at the raster unit, said disc being of opaque material with an aperture tangent to the shutter center of rotation and of circular shape, the diameter of said aperture being sufficiently large to define the effective field of view of the device upon its rotation with respect to the raster unit, the center of rotation of the shutter disc coinciding with the center of the field of view, whereby modulation of background illumination incident with the star light is minimized.

2. In a light tracking device having a star light of a star in a field of view and focusing the same on the star light beam modulating system the improvement in the star light beam modulating system which comprises a raster unit rotatable in a plane perpendicular to the path of the beam of light from the star and on a center which brings the periphery thereof into the field of view, said raster having alternate peripheral opaque and transparent areas of light transmission each of width at least that of star images in the field of view and arranged to intercept the star light and create a raster modulated light beam, and a shutter disc rotatable at the raster unit, said disc being of opaque material with an aperture tangent to the shutter center of rotation and of circular shape, the diameter of said aperture subtending an equal number of opaque and transparent raster areas whereby false modulation signal generation due to background light in the field of view is obviated.

3. In a light tracking device having a star light of a star in a field of view and focusing the same on the star light beam modulating system the improvement in the star light beam modulating system which comprises a raster unit rotatable in a plane perpendicular to the path of the beam of light from the star and on a center which brings the periphery thereof into the field of view, said raster having alternate peripheral opaque and transparent areas of light transmission each of width at least that of star images in the field of view and arranged to intercept the star light and create a raster modulated light beam, and a shutter disc mounted at the peripheral area of the raster unit and rotatable at said peripheral area of the raster unit, said disc being of opaque material with an aperture tangent to the shutter center of rotation and of circular shape, the diameter of said aperture being equal to an even number of said raster areas and sufficiently large to define the effective field of view of the tracking device upon its rotation with respect to the raster unit, the center of rotation of the shutter disc being coincident wtih the tracking device optical center, and means for rotating said shutter disc about its center to intercept the raster modulated light beam, said aperture being arranged to symmetrically intercept the raster areas throughout the 360° rotational sweep of the aperture, whereby false modulation signal generation due to background light in the field of view is obviated.

4. A light beam modulating system as defined by claim 1, further including a second circular aperture tangent to the first aperture and related 180° thereto.

5. A light beam modulating system as defined by claim 1, further including a second aperture tangent to the first aperture at the disc center of rotation and related 180° thereto, the first and second apertures being of the same diameter.

6. A light beam modulating system as defined by claim 4 in which the second aperture is smaller than the first aperture to enhance the tracking sensitivity of the device.

7. A light modulating system as defined by claim 2, further including a second aperture tangent to the first aperture at the disc center of rotation and related 180° thereto, the second aperture being smaller in diameter than the first aperture to enhance the tracking sensitivity of the device, the diameter of the second aperture subtending an even number of raster areas.

8. A light beam modulating system as defined by claim 1, further including a second aperture off-center with respect to the shutter center and related 180° to the first aperture position to enhance the acquisition sensitivity of the device.

9. A light modulating system as defined by claim 2, further including additional circular apertures off-center with respect to the shutter center to enhance the acquisition sensitivity of the device, the diameters of the additional apertures subtending an even number of raster areas.

10. A light beam modulating system as defined by claim 5, further including additional apertures off-center with respect to the shutter center to enhance the acquisition sensitivity of the device.

11. A light beam modulating system as defined by claim 6, further including additional apertures off-center with respect to the shutter center to enhance the acquisition sensitivity of the device, the diameters of the additional apertures subtending an even number of raster areas.

12. A light beam modulating system as defined by claim 1, further including aperture means in said shutter arranged to enhance the tracking sensitivity of the device at a signal frequency different from the fundamental shutter rotational frequency.

13. A light beam modulating system as defined by claim 1, further including first aperture means in the shutter arranged to enhance the tracking sensitivity of the device at a signal frequency different from the fundamental shutter rotational frequency, and second aperture means in the shutter arranged to enhance the acquisition sensitivity of the device at a signal frequency different from the tracking signal frequency.

14. A shutter for a star light beam modulation apparatus having a rotating raster unit; said raster unit having a plurality of radially disposed spaced light intercepting lines extending from the periphery thereof; said shutter comprising a rotatable disc having an aperture therein; said aperture being tangent to the center of rotation of said disc; said aperture being of circular shape; said disc rotating in a plane perpendicular to the plane of rotation of said raster; said raster being rotatable perpendicular to light rays impinged thereon.

15. The device substantially set forth in claim 14 wherein the diameter of said aperture is substantially equal to an even number of the raster unit beam interception areas.

References Cited in the file of this patent

UNITED STATES PATENTS

| | | |
|---|---|---|
| 2,167,484 | Berry | July 25, 1939 |
| 2,425,541 | Konet | Aug. 12, 1947 |
| 2,431,510 | Salinger | Nov. 25, 1947 |
| 2,451,971 | Oman | Oct. 19, 1948 |
| 2,513,367 | Scott | July 4, 1950 |
| 2,521,946 | Rathje | Sept. 12, 1950 |
| 2,678,581 | Reisner | May 18, 1954 |
| 2,713,134 | Eckweiler | July 12, 1955 |
| 2,838,600 | Salinger | June 10, 1958 |
| 2,878,396 | Behm et al. | Mar. 17, 1959 |
| 2,949,672 | Ostergren | Aug. 23, 1960 |
| 2,965,762 | Turck | Dec. 20, 1960 |